United States Patent [19]

Meguro

[11] Patent Number: 5,710,686
[45] Date of Patent: Jan. 20, 1998

[54] TAPE CASSETTE WITH MAIN BODY AND SLIDER LOCK FORMED BY DICHROMATIC MOLDING

[75] Inventor: Hiroshi Meguro, Miyagi, Japan

[73] Assignee: Sony Corporation, Tokyo, Japan

[21] Appl. No.: 571,350

[22] Filed: Dec. 13, 1995

[30] Foreign Application Priority Data

Dec. 28, 1994 [JP] Japan .................. 6-328760

[51] Int. Cl.[6] .................................................. G11B 23/08
[52] U.S. Cl. ................................................................ 360/132
[58] Field of Search ..................................... 360/132–133

[56] References Cited

U.S. PATENT DOCUMENTS

| 4,714,213 | 12/1987 | Watanabe et al. ............ 360/132 X |
| 4,945,440 | 7/1990 | Iwahashi et al. .............. 360/132 |
| 5,162,956 | 11/1992 | Emori et al. ................. 360/96.5 |
| 5,177,655 | 1/1993 | Kondo et al. ................. 360/132 |
| 5,412,525 | 5/1995 | Ota et al. ..................... 360/132 |
| 5,422,774 | 6/1995 | Ommori et al. ............... 360/132 |

*Primary Examiner*—John H. Wolff
*Attorney, Agent, or Firm*—Jay H. Maioli

[57] ABSTRACT

A tape cassette includes a cassette housing having formed therethrough a hub drive shaft insertion aperture, a slider slidably mounted on the lower surface of the casette housing so as to open and/or close the hub drive shaft insertion aperture or the like and a slider locking piece for locking the slider at a predetermined position in which the slider locking piece is molded together with the main body of the cassette housing by dichromatic molding.

5 Claims, 9 Drawing Sheets

TAPE CASSETTE WITH MAIN BODY AND SLIDER LOCK FORMED BY DICHROMATIC MOLDING

BACKGROUND OF THE INVENTION

The present invention relates generally to a tape cassette and, more particularly, to a tape cassette having a slider to open or close a hub drive shaft insertion aperture.

An example of a tape cassette will be described with reference to FIGS. 1 to 6.

In FIGS. 1 to 6, as the example of the tape cassette, there is shown a tape cassette 1 for use with a digital audio tape recorder (DAT). A housing 2 of this tape cassette 1 is formed by assembling an upper shell 3 and a lower shell 4, both of which are made of resin, using screws.

As shown in, for example, FIG. 2, hub drive shaft insertion apertures 5a and 5b, into which hub drive shafts provided on a cassette deck (not shown) are respectively inserted, are formed through the lower shell 4 at its center portion. In correspondence with the hub drive shaft insertion apertures 5a and 5b, a pair of hubs, i.e., a supply side hub 6a and a take-up side hub 6b are rotatably housed within the cassette housing 2. A magnetic tape 7 serving as a recording medium is wound around the hubs 6a and 6b under the condition that both ends are fixed to the hubs 6a and 6b, respectively.

On both side ends of the lower shell 4 at its front portion, there are formed guide posts 8a and 8b, respectively. The magnetic tape 7 unreeled from the supply side hub 6a is guided by the guide posts 8a and 8b, exposed to the front of the cassette housing 2 and then wound up by the take-up side hub 6b, which forms the tape travelling path.

A pocket portion 9 is formed on the front portion of the lower shell 4 by cutting away the portion of the lower shell 4 between the guide posts 8a and 8b in a recess shape. The tape loading member of the cassette deck (not shown) is inserted into the pocket portion 9.

Within the cassette housing 2, there are disposed a pair of liner sheets 10a and 10b to abut the hubs 6a and 6b from the upper and lower sides thereof so as to make the rotations of the hubs 6a and 6b smooth and also to avoid winding disturbance of the magnetic tape 7.

Further, the tape cassette 1 has a lid 11 to protect the magnetic tape 7 exposed to the front portion of the cassette housing 2. In more detail, the lid 11 is attached at its left and right side plate portions 11a and 11b to the front portion of the upper shell 3 to be rotatable in the up and down direction. Thus, when the tape cassette is not in use, the tape exposing portion provided in front of the cassette housing 2, to which the magnetic tape 7 is exposed, is covered by the lid 11, while when the tape cassette 1 is inserted into the cassette deck, the lid 11 is rotated in the up-direction by a lid releasing mechanism provided on the cassette deck side to thereby release the tape exposing portion.

Further, within the cassette housing 2, there is assembled a hub blocking member 12 so as to restrict the rotations of hubs 6a and 6b when the tape cassette 1 is not in use. Specifically, as shown in FIG. 2, the hub blocking member 12 is provided with engaging pawls 12a and 12b corresponding to the hubs 6a and 6b, respectively. When the tape cassette 1 is not in use, the engaging pawls 12a and 12b respectively engage with the hubs 6a and 6b to lock the latter and hence the hubs 6a and 6b are prevented from being rotated. On the other hand, when the tape cassette 1 is inserted into the cassette deck and the lid 11 is rotated upward, the hub blocking member 12 is moved in the front direction in ganged relation with the rotation of lid 11 such that the engaging pawls 12a, 12b are detached from the hubs 6a and 6b respectively and hence the hubs 6a and 6b are released from their locking states.

Further, the tape cassette 1 includes a slider 14 in order to open and/or close the hub drive shaft insertion apertures 5a, 5b and the pocket portion 9 through which the tape loading member is inserted.

The slider 14 is mounted on the lower surface side of the cassette housing 2, i.e., the lower portion of lower shell 4 to be slidable in the front and rear direction. Apertures 15a and 15b which correspond to the hub drive shaft insertion apertures 5a and 5b, respectively, are formed through the slider 14 at its center portion. The slider 14 is constantly biased in the front direction under spring-biasing force of a spring 13.

Therefore, when the cassette 1 is not in use, the slider 14 is located at its front moving portion to close the pocket portion 9 and also close hub drive shaft insertion apertures 5a and 5b because at this portion the apertures 15a, 15b do not correspond to the hub drive shaft insertion apertures 5a, 5b, whereby dust and so on are prevented from being introduced into the inside of cassette housing 2 (see FIG. 4A).

On the other hand, when the tape cassette 1 is inserted into the cassette deck, the slider 14 is moved in the rearward direction against the spring force of the spring 13 by the slider releasing mechanism provided on the cassette deck side to thereby open the pocket portion 9. At this time, since the apertures 15a and 15b of the slider 14 correspond to the hub drive shaft insertion apertures 5a and 5b, respectively, the latter are opened (see FIG. 4B).

Further, between the lower shell 4 of cassette housing 2 and the slider 14, there is provided a slider locking mechanism for locking the slider 14 at the two positions mentioned above, namely, the closed position and the open position, respectively.

The slider locking mechanism is formed of a slider locking piece 16 and front and rear engaging apertures 17a, 17b formed through the slider 14 in correspondence with the slider locking piece 16. When an engaging projection 16a formed at a tip end of the slider locking piece 16 is engaged with the engaging aperture 17a or 17b, the slider 14 is locked (see FIG. 4A or 4b).

In other words, as shown in FIG. 4A, when the slider 14 is located at the front close position, the engaging projection 16a of the slider locking piece 16 is engaged with the rear engaging aperture 17b of slider 14 to lock the latter at that position, while when the slider 14 is located at the rear open position as shown in FIG. 4B, the engaging projection 16a of slider locking piece 16 is engaged with the front engaging aperture 17a so that the slider 14 is locked at that position.

In order to positively lock the slider 14 with good balance, the above-mentioned slider locking mechanism or a set of a slider locking piece 16 and front and rear engaging apertures 17a, 17b is provided at left and right sides of the cassette housing 2.

The releasing operation for the slider locking mechanism or operation to disengage the engaging projection 16a of slider locking piece 16 from the engaging aperture 17a or 17b is carried out by the slider lock releasing mechanism provided on the cassette deck side.

According to the tape cassette 1 having the slider locking mechanism described above, if any plastic deformation is generated in a part of the slider locking piece 16 after long use, the locking effect on the slider 14 is lost. Thus, the slider 14 is easily opened and the function inherent in the slider locking mechanism disappears.

In order to avoid the above-mentioned defect, there is employed such a structure that, as shown in FIG. 3, a slider locking spring 18 is interposed between the upper shell 3 and the tip end portion of slider locking piece 16 within the cassette housing 2, whereby the slider locking spring 18 assists the slider locking piece 16 to lock the slider 14.

In this case, in order that the spring force of the slider locking spring 18 acts effectively, it is necessary to employ such a structure that a thickness t of a base portion 16b of slider locking piece 16 is made thin (about 0.4 mm in real dimension) as may be clear from FIG. 5 and hence the slider locking piece 16 can be easily flexed.

However, if the thickness t of the base portion 16b of slider locking piece 16 is thin as described above, a short molding is easily caused in the thin base portion 16b upon molding the lower shell 4.

In other words, when the lower shell 4 is molded, as shown in FIG. 6, resin is cast into the inside of a metallic mold through a gate G1 formed at one point of the central portion thereof. The cast resin flows within the metallic mold in the streams shown by dotted lines a and b to mold the main body of lower shell 4 at first and finally flows along streams shown by a dotted line c to mold the slider locking piece 16. Therefore, no sufficient molding pressure exerts upon the slider locking piece 16 so that a weld mark will be produced on the thin base portion 16b and in the worst case a short mold will be caused in the thin base portion 16b.

Accordingly, the yield of molded products is poor. Further, when the lower shell 4 is molded, greatest care must be paid and after molding the lower shell 4, it should be checked. Thus, a number of operations are necessary.

SUMMARY OF THE INVENTION

In view of the aforesaid aspect, it is an object of the present invention to provide a tape cassette in which a short molding can be prevented from being caused in the thin cassette assembly.

It is another object of the present invention to provide a tape cassette in which a yield in the molding can be improved.

It is still another object of the present invention to provide a tape cassette in which the number of assembly processes is reduced.

It is a further object of the present invention to provide a tape cassette in which a slider can be locked highly reliably.

It is yet a further object of the present invention to provide a tape cassette which can be easily made by dichromatic molding.

According to an aspect of the present invention, a tape cassette includes a cassette housing having a hub drive shaft insertion aperture, a slider slidably mounted on the lower surface of the cassette housing to open and/or close the hub drive shaft insertion aperture or the like and a slider locking piece for locking the slider at a predetermined position, wherein the slider locking piece is molded together with the main body of the cassette housing by dichromatic molding.

According to the tape above cassette, when the slider locking piece is molded, a sufficient molding pressure is applied thereto. Therefore, no short molding is generated even in a thin portion of the slider locking piece. Accordingly, the yield upon the molding can be improved and also the number of operations is reduced.

DETAILED DESCRIPTION OF THE PREFERRED EMBODIMENTS

Figure 1:
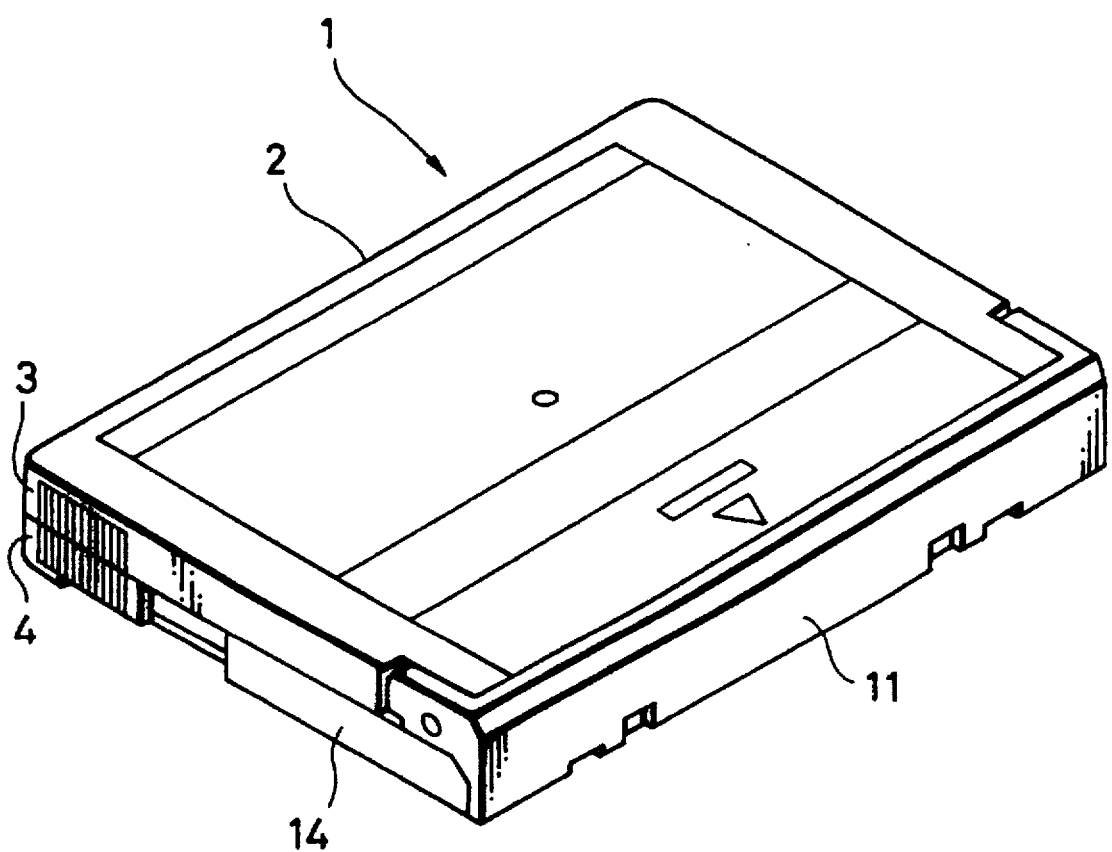
FIG. 1 is a perspective view showing an example of the tape cassette.
Figure 2:
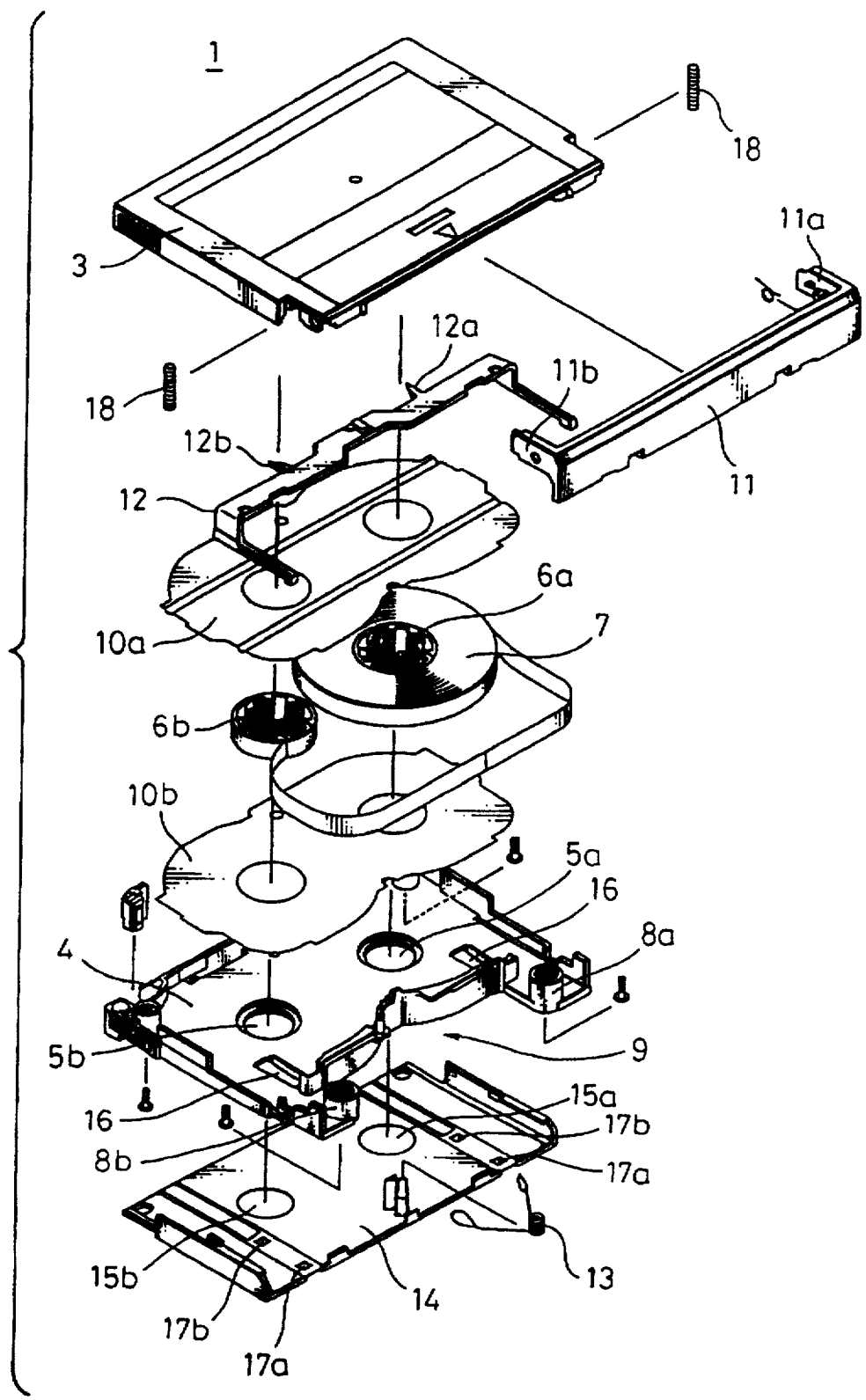
FIG. 2 is an exploded perspect view of the tape cassette shown in FIG. 1.
Figure 3:
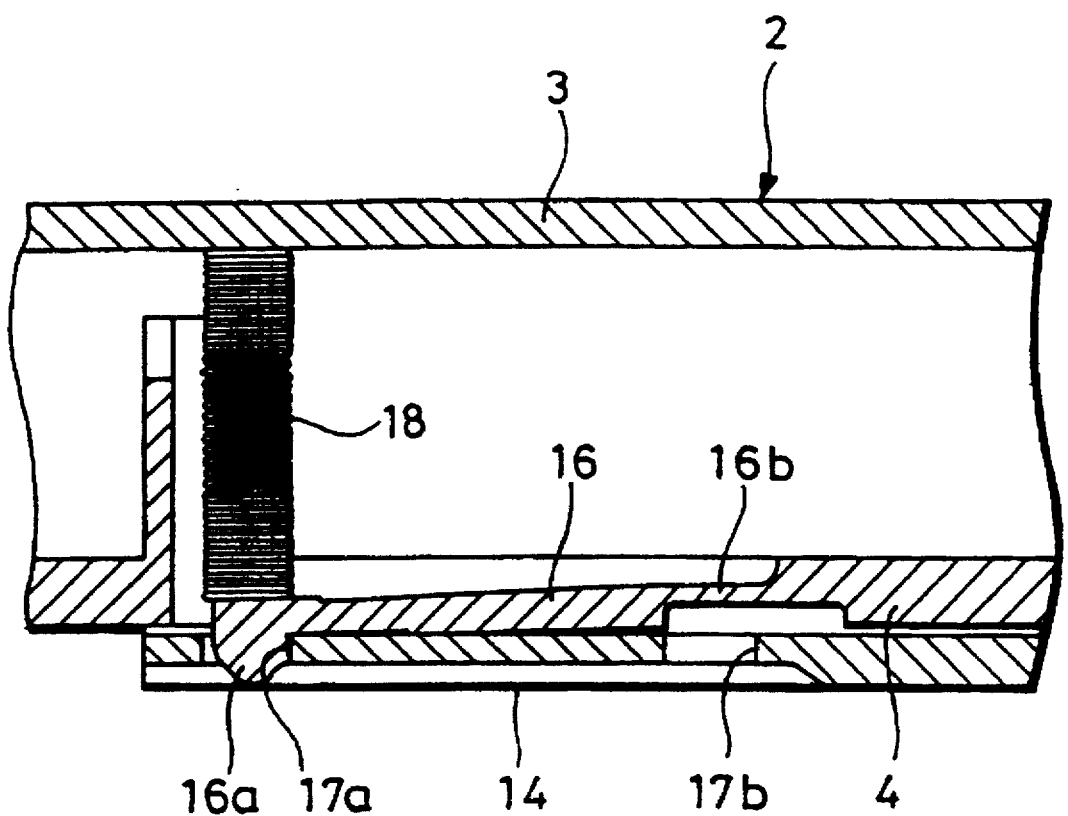
FIG. 3 is a cross-sectional view showing a main part (slider locking mechanism) of the tape cassette shown in FIG. 1.
Figure 4A:
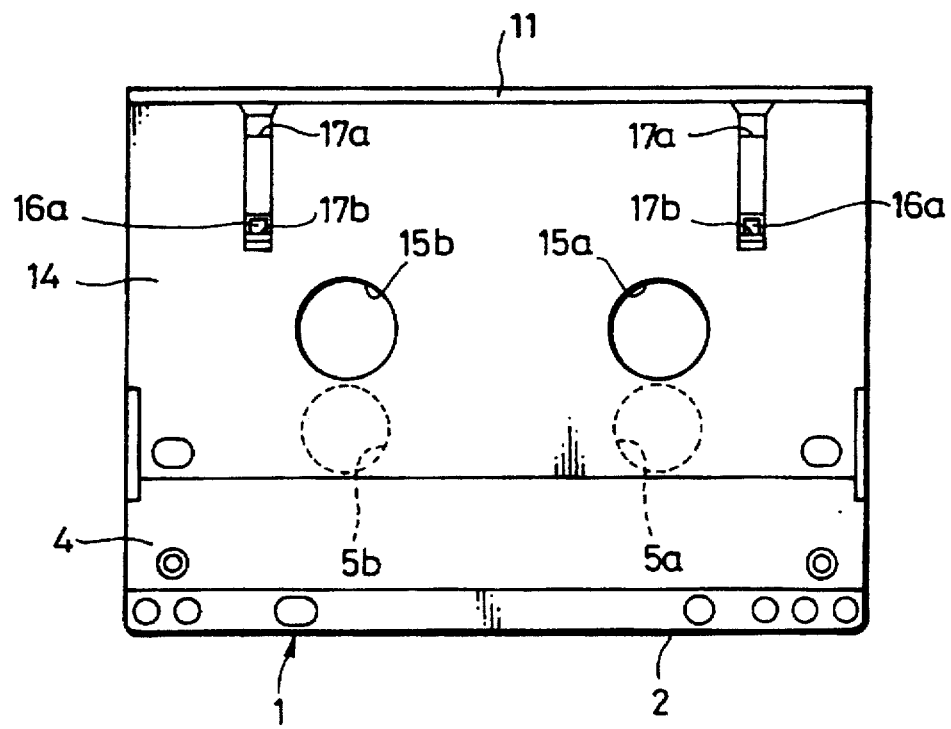
FIG. 4A shows the bottom of the tape cassette shown in FIG. 1 when its slider is closed.
Figure 4B:
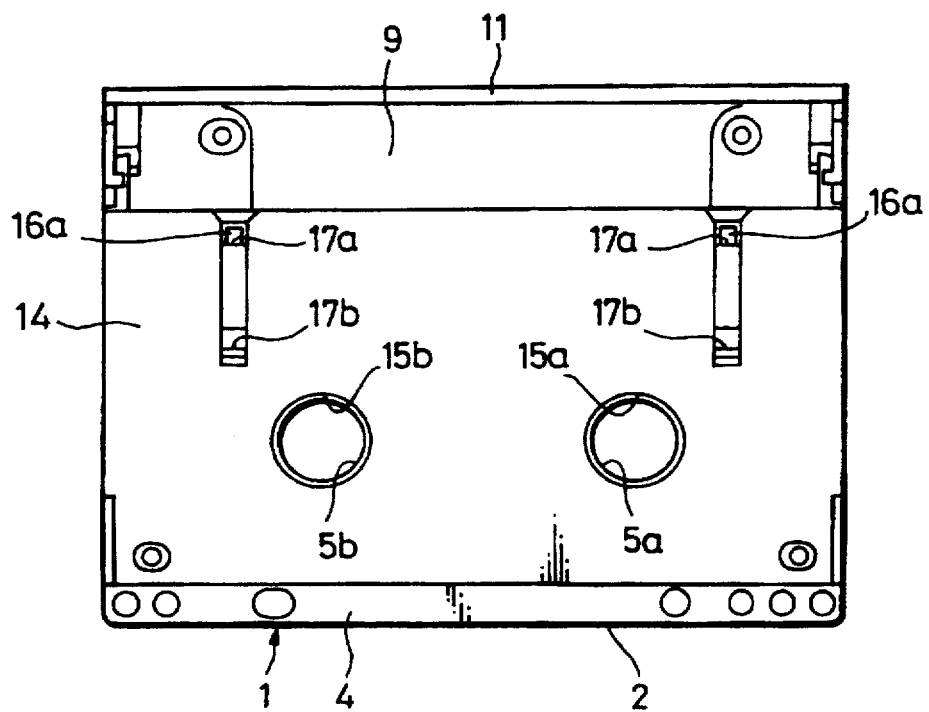
FIG. 4B shows the same bottom when the slider is opened.
Figure 5:
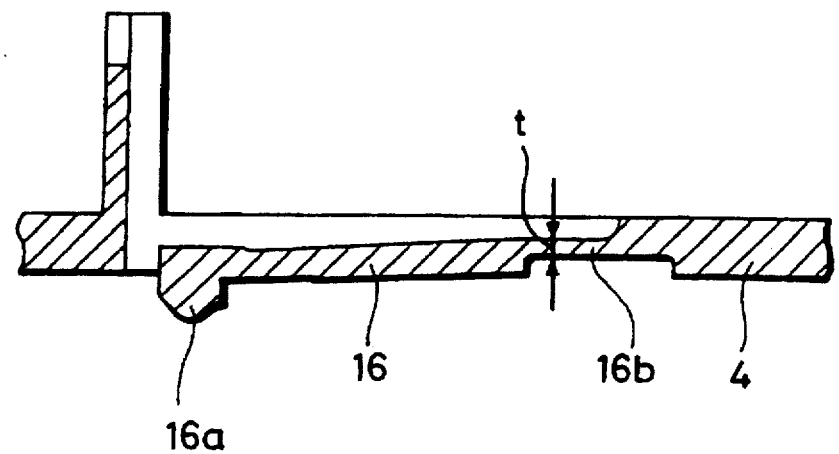
FIG. 5 is a cross-sectional view of a main portion (portion of a slider locking piece) of a lower shell of the tape cassette shown in FIG. 1.
Figure 6:
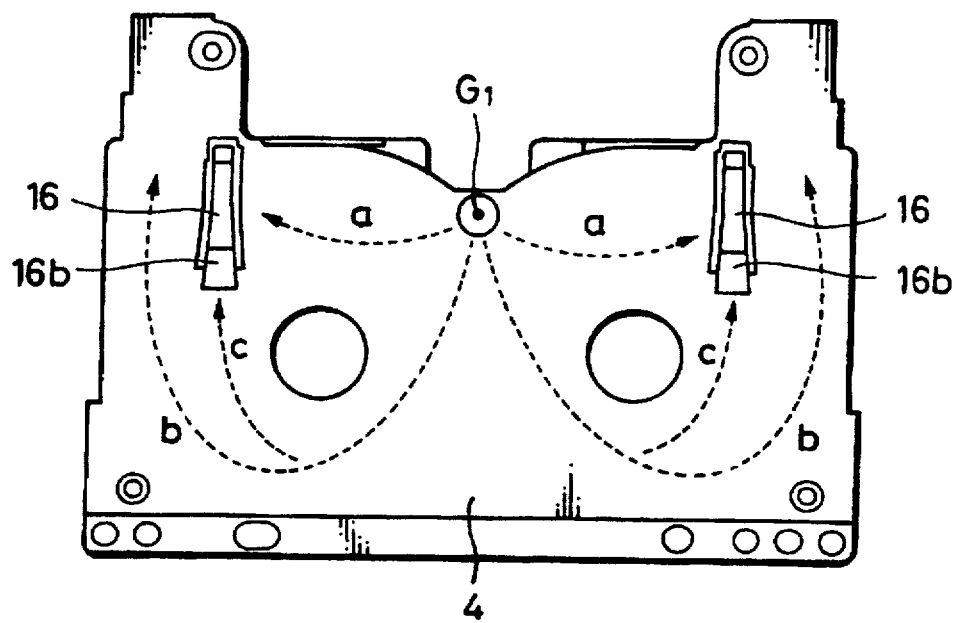
FIG. 6 is a diagram used to explain the flow of resin when the lower shell is molded.

Embodiments of the present invention will be described with reference to FIGS. 7 to 13 in which reference numerals same as those used in FIGS. 1 to 6 designate the same or like elements or parts.

A tape cassette according to the present invention has a feature particularly in the structure of its lower shell 4. The parts or portions of the tape cassette of the invention except for the lower shell 4 are the same as those of the above tape cassette so that only the lower shell 4 is shown in the following figures and explained in the following description.

A first embodiment of the present invention will be explained with reference to FIGS. 7 to 9.

In the first embodiment, left and right slider locking pieces 16 and base portions 16c thereof are molded integral or together with a main body of a lower shell 4 by dichromatic molding.

Figure 7:
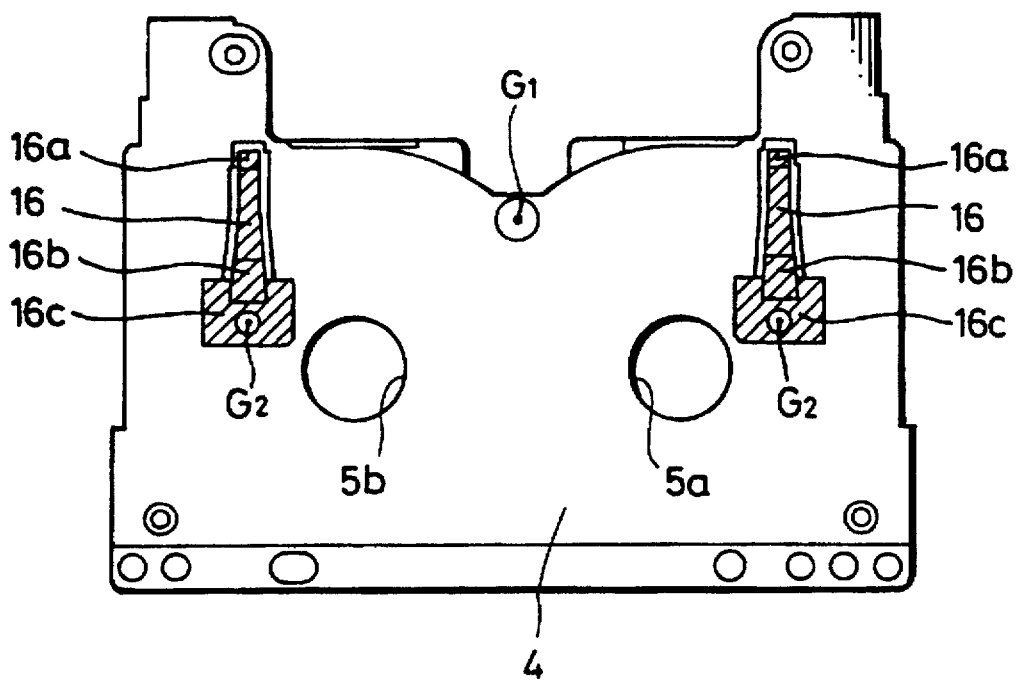
FIG. 7 is a diagram showing the lower surface of a lower shell according to a first embodiment of the present invention.
Figure 8:
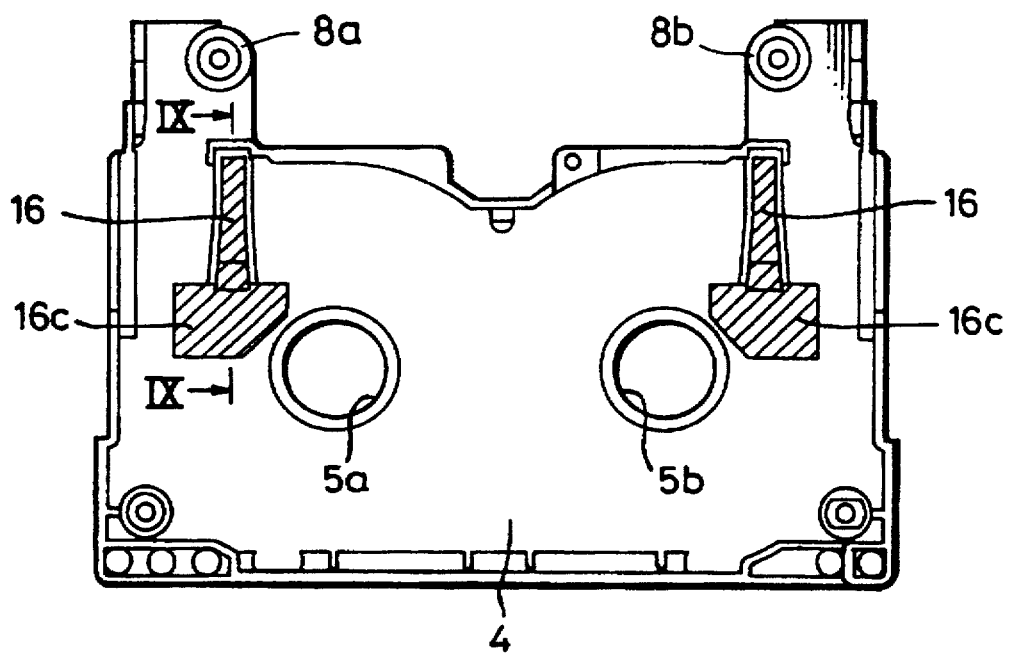
FIG. 8 is a diagram showing the upper surface of the lower shell shown in FIG. 7.

In this case, since the left and right slider locking pieces 16 are independent from each other, a gate G2, through which molding resin is cast into the cavity of each of the slider locking pieces 16 in a metallic mold, is formed therethrough at the base portion 16c of each of the left and right slider locking pieces 16 or two points at the left and right sides, as shown in FIG. 7. On the other hand, a gate G1 through which resin to mold the main body of lower shell 4 is cast is formed through the metallic mold at one point on its center portion similar to the aforementioned example.

The lower shell 4 is molded by such a process that at first, resin is cast into the inside of the metallic mold through the gate G1 to mold the main body of lower shell 4 (primary molding), subsequently a part of the metallic mold is moved before the cast resin is not completely cured and then resin is cast into the metallic mold through the left and right gates G2 to mold the portions of the slider locking pieces 16 (secondary molding).

The main body portion of lower shell 4 and the portions of its slider locking pieces 16, which are molded together, are united before their resins are completely cured, so that these portions are positively and firmly bonded together.

Figure 9:
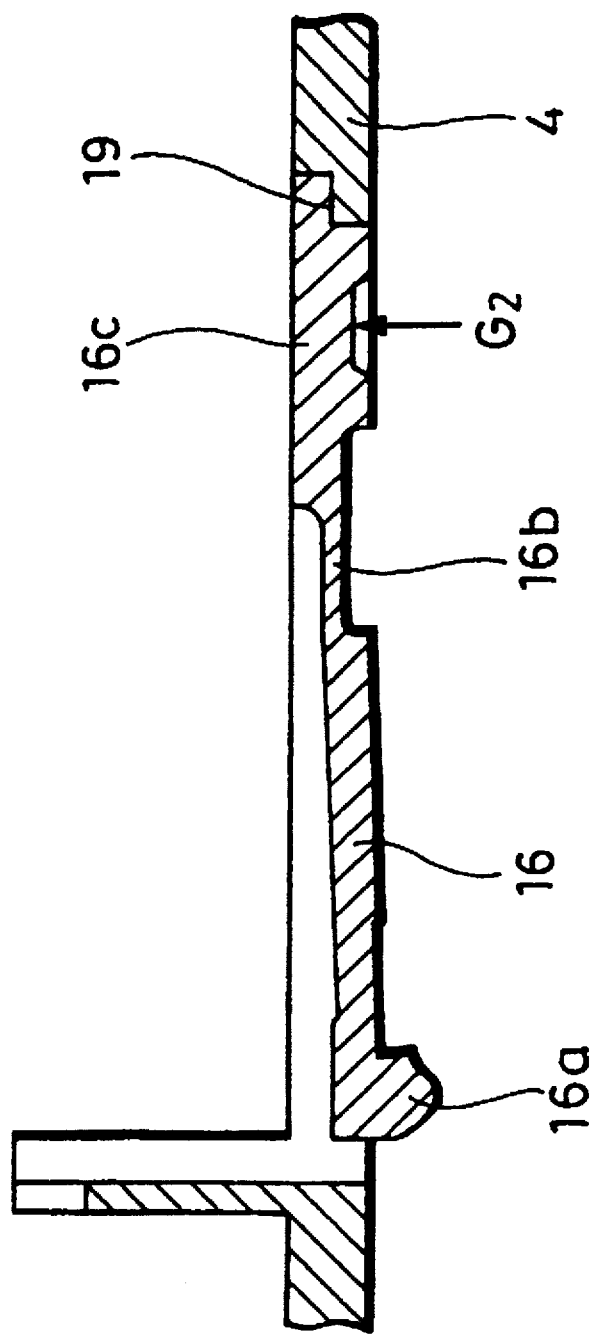
FIG. 9 is a cross-sectional diagram taken along the line IX—IX in FIG. 8.

As shown clearly in FIG. 9, the bonded portion of the main body of lower shell 4 and the slider locking piece 16 has a step 19 therein. Thus, the bonding area therebetween is increased to thereby ensure a stronger bonding strength therebetween.

A second embodiment of the present invention will be described with reference FIGS. 10 to 13.

In the first embodiment described above, although the two gate structure is employed in which the gate G2 for casting the resin therethrough is provided at two points or for each of the left and right slider locking pieces 16, in the second embodiment only one gate is formed.

Figure 10:
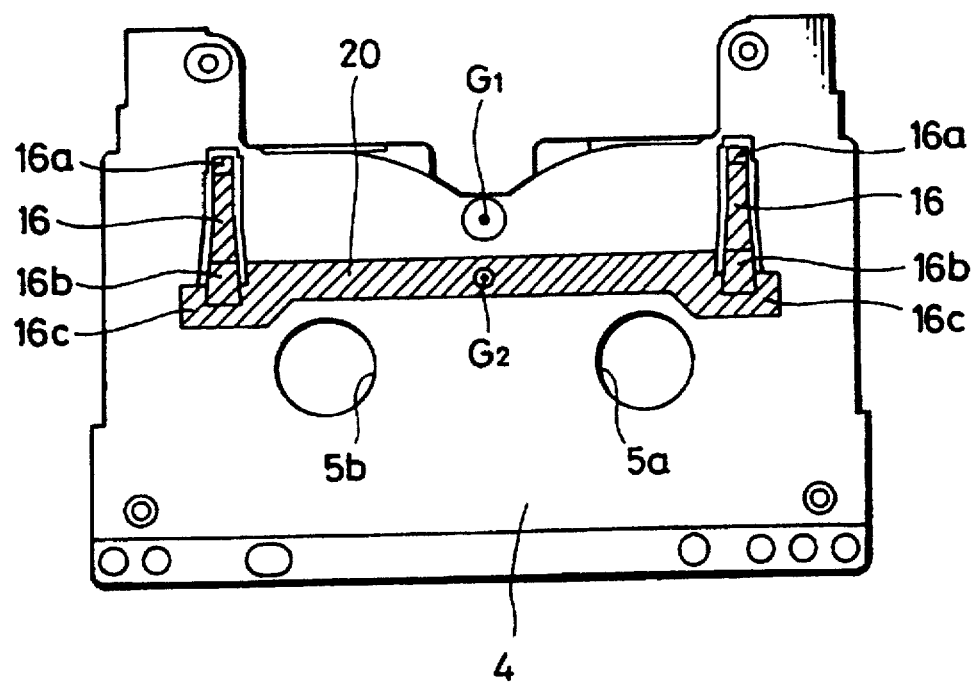
FIG. 10 is a diagram showing the lower surface of a lower shell according to a second embodiment of the present invention.
Figure 11:
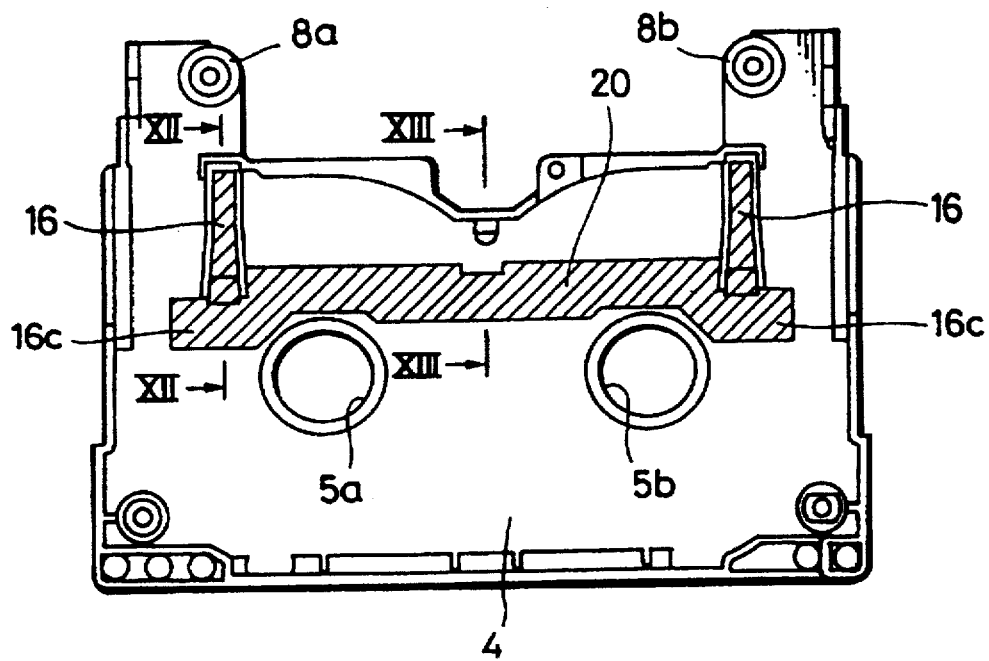
FIG. 11 is a diagram showing the upper surface of the lower shell shown in FIG. 10.

Specifically, the second embodiment includes a connecting band portion 20 which connects the base portions 16c of left and right slider locking pieces 16 in addition to the structure of the first embodiment. The connection band portion 20 is formed as a flow path of resin to the left and right slider locking pieces 16. To this end, a resin casting gate G2 is formed at one point on the center of connecting band portion 20 as shown in FIG. 10.

The molding process to produce the lower shell 4 is as follows. That is, similar to that of the first embodiment, resin is cast into the metallic mold through the gate G1 to mold the main body of lower shell 4 first, and subsequently before the cast resin is not cured completely, a part of the metallic mold is moved to cast resin through the gate G2 into the metallic mold to mold the connecting band portion 20 and the left and right slider locking pieces 16 together.

Figure 12:
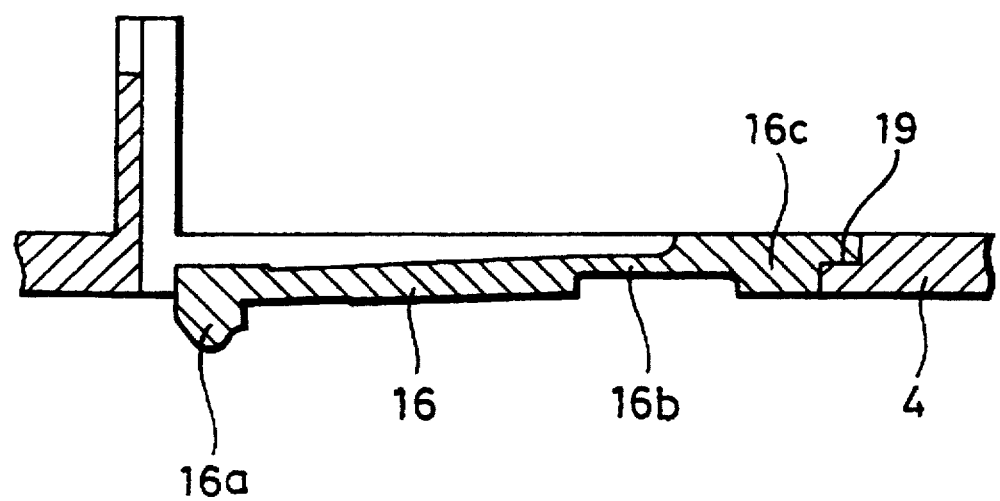
FIG. 12 is a cross-sectional view taken along the line XII—XII in FIG. 11.
Figure 13:
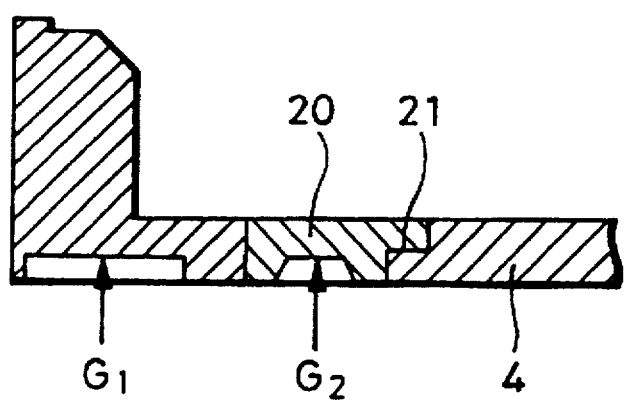
FIG. 13 is a cross-sectional view taken along the line XIII—XIII in FIG. 11.

In the second embodiment, similar to the first embodiment the bonding portion of the main body of lower shell 4 to each of the slider locking portions 16 includes a step 19 as shown in FIG. 12, whereby the bonding strength therebetween can be ensured sufficiently. Also, the bonding portion of the main body of lower shell 4 to the connecting band portion 20 includes a step 21 as shown in FIG. 13 for the same purpose of the former bonding portion.

As in the first and second embodiments of the present invention, when the slider locking piece 16 is molded together with the lower shell 4 by dichromatic molding, sufficient molding pressure is applied to the portion of slider locking piece 16. Therefore, even if the thickness of base portion 16b of slider locking piece 16 is thin, the base portion 16c is filled by resin finely without any short molding such as a weld mark or the like being generated therein.

Particulary, in the first embodiment since the gate G2 is formed at the position corresponding to the base portion 16c of slider locking piece 16 or the position of gate G2 is very close to the slider locking piece 16, this slider locking piece 16 can be molded by a sufficient filling or molding pressure. Thus, the effect of the invention mentioned just above becomes more remarkable.

In the above embodiments of the present invention, the resin used to mold the slider locking piece 16 (resin cast through the gate G2) is the same kind of resin used to mold the main body of lower shell 4 (resin cast through the gate G1).

Specifically, since an ABS (acrylonitrile-butadiene-styrene) resin, for example, should preferably be used to mold the main body of lower shell 4, the slider locking piece 16 is molded also by use of the same ABS resin.

As described above, the main body of the lower shell 4 and the slider locking piece 16 are molded by using the same kind of resin, whereby the bonding property thereof is excellent, or the resins are blended more smooothly. Therefore, it is possible to present a strong bonding strenth more positively.

Further, it may be possible to use a resin with good abrasion resistance as the resin to mold the slider locking piece 16.

As the resin with good abrasion resistance, a resin produced by mixing, for example, the ABS resin with polycarbonate can be used.

Since the slider locking piece 16 is molded by using the resin with good abrasion resistance as set forth above, the abrasion of slider locking piece 16 is reduced. Therefore, even when the tape cassette is used for a long period of time, the slider can be locked positively.

Also, a resin of good lubricity may be used as the resin to mold the slider locking piece 16. As the resin with good lubricity, a resin prepared by mixing the ABS resin with silicon can be used.

When the slider locking piece 16 is molded by using the resin with good lubricity, the friction between the slider locking piece 16 and the slider 14 is reduced. As a result, the slider 14 can be moved or slid more smoothly.

Further, if the slider locking piece 16 is molded by using a resin which is resistant to plastic deformation, it is possible to remove the slider locking spring 18 (see FIG. 3) which is used to assist the slider locking force of the slider locking piece 16.

A resin produced by mixing the ABS resin with polycarbonate is preferred as the resin resistant to plastic deformation.

According to the present invention, the portion of the slider locking piece is molded together with the main body of the cassette housing or its lower shell by the dichromatic molding so that when the slider locking piece is molded, sufficient molding pressure can be applied therto. Therefore, no short molding is caused even in the thin portion of the slider locking piece.

Accordingly, the yield of the molding operation can be improved and the checking of the product or the like after being molded becomes unnecessary, which leads to reducing the number of operations.

Further, the reliability of the slider locking operation is also improved remarkably. In addition, the present invention can be realized by the production technique for the known dichromatic molding using a metallic die with ease.

Although the preferred embodiments of the present invention are specifically illustrated and described herein, it will be appreciated that many modifications and variations of the present invention are possible in light of the above teachings and within the purview of the appended claims without departing from the spirit and intended scope of the invention.

What is claimed is:

1. A tape cassette assembly comprising:

a cassette housing formed of a first cast resin including a main body and having formed therethrough a hub drive shaft insertion aperture at a step-shaped bonding portion at a predetermined location therein;

a slider being slidably mounted on a lower surface of said cassette housing to open and/or close said hub drive shaft insertion apertures; and a slider locking piece for locking said slider at a predetermined position, wherein said slider locking piece is formed of a second cast resin selected from one of a resin having excellent abrasion resistance and a resin having good lubricity and is attached to said main body by dichromatic molding at said step-shaped bonding portion for increasing a bonding area between said slider locking piece and said main body.

2. The tape cassette as claimed in claim 1, wherein said slider locking piece has a shape such that a gate through which said second resin is cast to mold said slider locking piece is formed at a base portion of said slider locking piece.

3. The tape cassette as claimed in claim 1, in which said slider locking piece comprises left and right slider locking portions, and said slider locking piece has a shape such that a gate through which said second resin is cast to mold said left and right slider locking portions is formed at a substantially central position between said left and right slider locking portions.

4. The tape cassette as claimed in claim 1, wherein said second resin having excellent abrasion resistance is acrylonitrile-butadiene-styrene with polycarbonate.

5. The tape cassette as claimed in claim 1, in which said second resin having good lubricity is acrylonitrile-butadiene-styrene with silicon.

* * * * *